United States Patent
Molinelli

(10) Patent No.: US 12,449,025 B2
(45) Date of Patent: Oct. 21, 2025

(54) LINEAR ACTUATOR

(71) Applicant: Microtecnica S.r.l., Turin (IT)

(72) Inventor: Dario Molinelli, Carnate (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 18/527,726

(22) Filed: Dec. 4, 2023

(65) Prior Publication Data

US 2024/0183433 A1 Jun. 6, 2024

(30) Foreign Application Priority Data

Dec. 6, 2022 (EP) .................................... 22425058

(51) Int. Cl.
- *F16H 25/20* (2006.01)
- *F16H 25/24* (2006.01)
- *F16H 25/22* (2006.01)

(52) U.S. Cl.
CPC ....... F16H 25/205 (2013.01); F16H 25/2454 (2013.01); *F16H 2025/2081* (2013.01); *F16H 25/2204* (2013.01)

(58) Field of Classification Search
CPC ......... F16H 2025/2081; F16H 25/2454; F16H 25/205

See application file for complete search history.

(56) References Cited

U.S. PATENT DOCUMENTS

| | | | |
|---|---|---|---|
| 4,637,272 A | 1/1987 | Teske et al. | |
| 7,963,529 B2 | 6/2011 | Oteman et al. | |
| 10,066,715 B2 * | 9/2018 | Larson | B64C 13/341 |
| 11,105,404 B2 | 8/2021 | Borgarelli et al. | |
| 11,680,616 B2 * | 6/2023 | Manzanares | B60T 13/74 188/72.8 |
| 2007/0068291 A1 | 3/2007 | Beatty et al. | |

FOREIGN PATENT DOCUMENTS

| | | |
|---|---|---|
| EP | 3330570 A1 | 6/2018 |
| WO | 2007099333 A1 | 9/2007 |
| WO | 2008112363 A2 | 9/2008 |
| WO | 2016172029 A1 | 10/2016 |

OTHER PUBLICATIONS

European Search Report for Application No. 22425058.9, mailed May 10, 2023, 10 pages.

* cited by examiner

*Primary Examiner* — Gregory Robert Weber
(74) *Attorney, Agent, or Firm* — CANTOR COLBURN LLP

(57) ABSTRACT

A linear actuator arranged to convert rotary motion to linear motion. The linear actuator includes a linear shaft arrangement, having a first shaft portion and a second shaft portion and extends along a longitudinal axis (A) of the linear actuator. At least one of the first shaft portion and the second shaft portion of the linear shaft arrangement can be translated linearly along the longitudinal axis upon actuation. A first drive system has a first rotary component extending at least partially around the longitudinal axis. A second drive system has a second rotary component extending at least partially around the longitudinal axis at a different axial position to the first drive system. The linear actuator, when the first drive system fails, allows rotation of the second rotary component so that the second shaft portion moves relative to the first shaft portion.

9 Claims, 6 Drawing Sheets

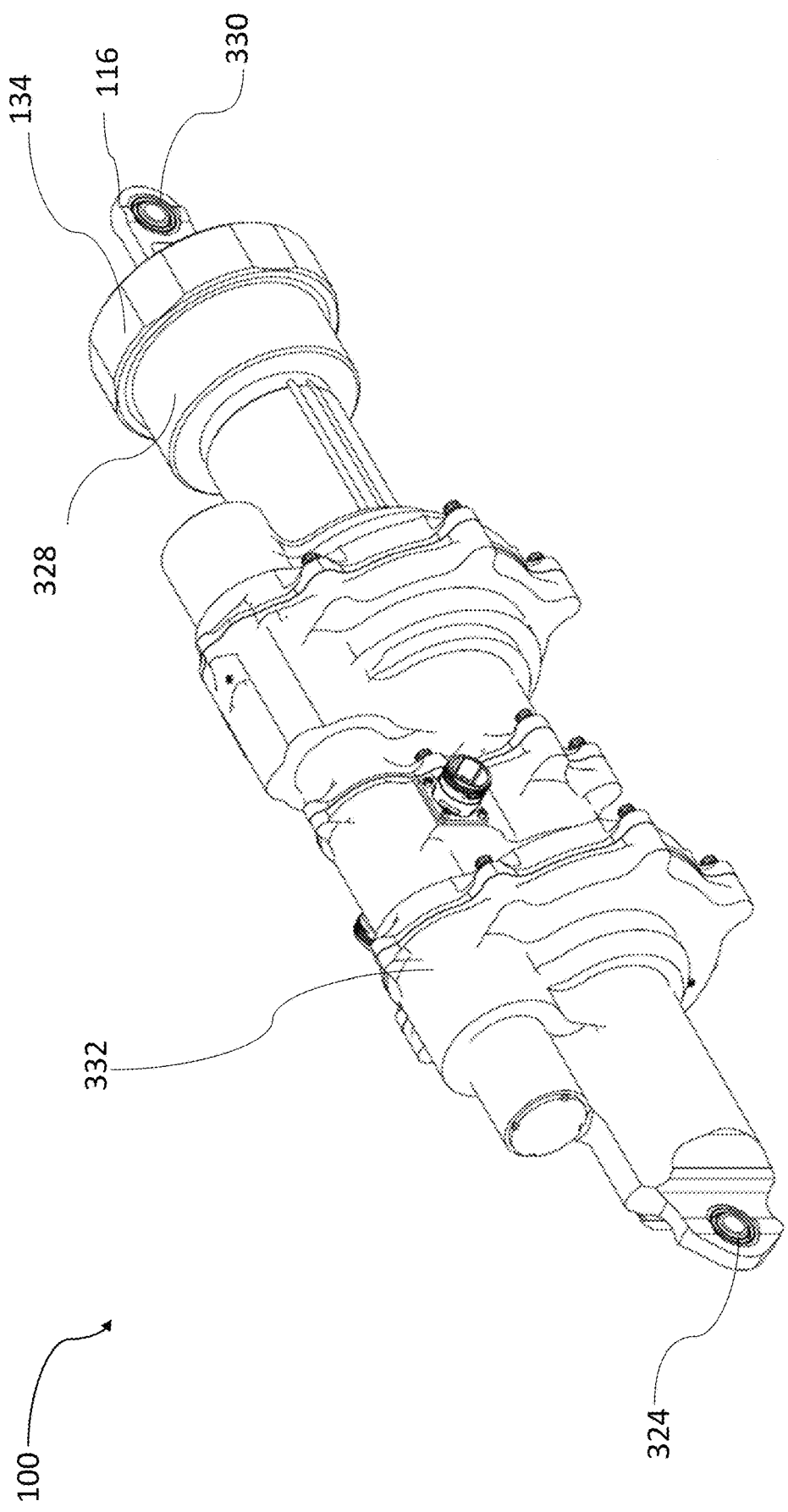

LINEAR ACTUATOR

CROSS REFERENCE TO RELATED APPLICATIONS

This application claims priority to European Patent Application No. 22425058.9 filed Dec. 6, 2022, the entire contents of which is incorporated herein by reference.

FIELD OF TECHNOLOGY

This disclosure relates to a linear actuator for converting rotary motion into linear motion and also to linear actuator systems and methods using the linear actuator.

BACKGROUND OF THE INVENTION

Rotary motion may be converted into linear motion using mechanical or electromechanical rotary-to-linear actuators such as ball screws and roller screws. Rotary-to-linear actuators can provide high force linear thrust from rotation provided by a motor.

Ball screws typically comprise a central screw shaft with helical grooves, a nut and recirculating ball bearings that roll along a continuous path between the nut and screw when relative rotation is introduced between the screw shaft and the nut. A roller screw, on the other hand, typically uses a number of smaller threaded recirculating rollers, between the nut and screw shaft, which together surround and extend parallel to the central screw shaft.

In some rotary-to-linear actuators, failures can occur. Examples of such failures could include jamming between the central shaft and the interfacing components—e.g. ball bearings or rollers—or a breakdown of any of the components that drive the rotation of one of the rotary components, e.g. motors, gears. In some cases, a failure of a rotary-to-linear actuator can partially, or even fully, prevent translational linear movement of the shaft or screw.

The present disclosure aims to provide a solution to failures of rotary-to-linear actuators.

SUMMARY OF THE INVENTION

According to this disclosure there is provided, according to a first aspect, a linear actuator arranged to convert rotary motion to linear motion. The actuator includes a linear shaft arrangement, comprising a first shaft portion and a second shaft portion. The linear shaft arrangement extending along a longitudinal axis of the linear actuator. At least one of the first shaft portion and the second shaft portion of the linear shaft arrangement is arranged to be translated linearly along the longitudinal axis upon actuation of the linear actuator. The linear actuator also includes: a first drive system comprising a first rotary component arranged to extend at least partially around the longitudinal axis and arranged to rotate about the longitudinal axis to actuate the linear shaft arrangement; and a second drive system comprising a second rotary component arranged to extend at least partially around the longitudinal axis at a different axial position to the first drive system. The linear actuator is arranged, when the first drive system fails, to effect rotation of the second rotary component about the longitudinal axis to actuate the linear shaft arrangement so that the second shaft portion moves relative to the first shaft portion.

According to a second aspect there is provided a linear actuator system. The system includes: a linear actuator according to the first aspect; and a control system arranged to control operation of the linear actuator and to determine when the first drive system fails. The control system is arranged to control the linear actuator to effect rotation of the second rotary component about the longitudinal axis to actuate the linear shaft arrangement so that the second shaft portion moves relative to the first shaft portion, when the control system has determined a failure of the first drive system.

According to a third aspect there is provided a method of operating the linear actuator system according to the second aspect. The method includes: determining a failure of the first drive system; and when failure of the first drive system has been determined by the control system, controlling the linear actuator to effect rotation of the second rotary component about the longitudinal axis to actuate the linear shaft arrangement so that the second shaft portion moves relative to the first shaft portion.

The first drive system, therefore, comprises a first rotary component arranged to extend at least partially (e.g., fully) (azimuthally) around the longitudinal axis. The first rotary component is also arranged to rotate about the longitudinal axis to actuate the linear shaft arrangement (e.g., during normal operation of the linear actuator). The second drive system, on the other hand, is located at a different axial position (on the longitudinal axis) to the first drive system, i.e., the first drive system and the second drive system are spaced axially (along the longitudinal axis) from each other.

The second rotary component is arranged to extend at least partially (e.g. fully) (azimuthally) around the longitudinal axis of the linear actuator. In normal operation, the second drive system may be on standby mode (e.g., so that the first shaft portion is fixed to the second shaft portion, allowing no relative motion between the first and second shaft portion, in the standby mode). When a failure of the first drive system is detected, the (e.g., second drive system of the) linear actuator is arranged to effect rotation of the second rotary component.

Thus, the linear actuator is arranged to, upon failure (e.g., a jam or other stoppage) of the first drive system, allow and effect rotation of the second rotary component about the longitudinal axis to actuate the linear shaft arrangement, so that the second shaft portion can move relative to the first shaft portion. This may allow the linear actuator to continue working when translation of the first shaft portion is limited or prevented by a failure of the first drive system.

The person skilled in the art would appreciate that the longitudinal axis of the linear actuator is to be understood as a line which is (substantially parallel or) parallel to the length of the linear actuator. This longitudinal axis need not (but may) be located at a centre of the linear actuator. The longitudinal axis of the linear actuator is, in some examples, coaxial with the centre point of a transverse cross-section of the first shaft component. Similarly, the longitudinal axis of the linear actuator may be coaxial with the centre point of a transverse cross-section of the second shaft component.

In some examples, at least one of the first shaft portion and the second shaft portion of the linear shaft arrangement is arranged to be translated (e.g. to reciprocate) linearly along an axis of actuation. The axis of actuation may be coaxial with (and correspond to) the longitudinal axis of the linear actuator.

In some examples, the linear actuator is arranged to be operated in a first (normal) mode and a second (back-up) mode. When the linear actuator is being operated in the first mode, the second drive system may be in a standby mode (e.g. wherein the second drive system is not actively driving the linear actuator).

In some examples, when the linear actuator is operating in the first mode, e.g. operating normally, the linear shaft arrangement is driven by the first drive system to (be actuated and) move relative to the first rotary component with the first shaft portion and second shaft portion being fixed relative to each other. Thus, the linear shaft arrangement, upon actuation of the linear actuator, may move as a single unit when operating in the first mode.

The linear actuator may be arranged to be operated in the second mode when the first drive system fails. The second mode may be triggered in response to the control system determining a failure of the first drive system (e.g., due to a jam or other stoppage causing the restriction or prevention of translation of the first shaft portion). In the second mode, the second drive system may be activated (e.g., by turning on (energising) the second motor).

When operating in the second mode, the second shaft portion may be driven by the second drive system to move independently of the first shaft portion (and to move relative to the first shaft portion) to allow the moveable end to continue translating in a desired direction (e.g., by retracting or extending).

In some examples, when the linear actuator is operating in the first mode, the relative movement between the first shaft portion and the second shaft portion is prevented by a brake. In the second mode, the brake may be released to allow relative translation and movement between the first shaft portion and the second shaft portion.

The linear actuator may be a rotary-to-linear actuator for converting rotary motion to linear motion. For example, the linear actuator may comprise a lead screw linear actuator, a ball screw linear actuator or a (planetary) roller screw linear actuator. The linear actuator may comprise one or more motors for providing initial rotary motion.

In some examples, the linear actuator may extend between a first end and a second end, the second end being a moveable end. The first end and second end may be defined by the one or more housing(s) around the linear actuator.

Actuation of the linear shaft arrangement may cause the moveable end to translate along the longitudinal axis, relative to the first (e.g., fixed) end. The first shaft portion may be proximal to the first end and the second shaft portion may be proximal to the moveable end. One or both ends of the linear actuator may comprise a mount, e.g. a clevis mount, for fastening to other components, e.g. to be operatively connected to a flight control surface of an aircraft.

In some examples, the first shaft portion and second shaft portion are moveably connected to each other via the second rotary component. The second rotary component may be a rotational coupling, e.g., which allows the second shaft portion to be rotated and translated axially relative to the first shaft portion upon a failure of the first drive system. In some examples, upon a failure of the first drive system, the second rotary component is energised (e.g., rotated) allowing the second shaft portion to rotate about and translate along a longitudinal axis of the first shaft portion (e.g., coaxial with the longitudinal axis of the linear actuator).

In some examples, the second shaft portion is in contact with the moveable end via one or more (e.g., frictionless) bearing(s). The bearings allow (linear) translation of the moveable end while preventing rotation of the moveable end.

The first shaft portion and/or the second shaft portion may be substantially cylindrical. The first shaft portion and/or the second shaft portion may be hollow. In some examples, the second shaft portion may comprise a substantially cylindrical hollow shape, arranged as a sleeve having a greater (e.g., internal) cross-sectional diameter than the (e.g., external) cross-sectional diameter of the first shaft portion. In other words, the second shaft portion may be hollow and sized and shaped to allow the first shaft portion to fit at least partially within it. The second shaft portion may move coaxially relative to the screw.

In some examples, the first shaft portion comprises a screw shaft portion. The screw shaft portion may comprise helical grooves (e.g., a screw thread) on an outer surface of the screw shaft portion. The first rotary component may be arranged to engage with the helical grooves, e.g., via ball bearings.

The screw shaft portion may be arranged to interface with the first rotary component (e.g., and the second rotary component) via ball bearings or rollers—e.g. arranged as a ball screw or a roller screw. The first rotary component may comprise a nut, e.g., a ball nut for a ball screw.

The first shaft portion may comprise one or more (e.g. three) flanges protruding radially from (and extending azimuthally around) the first shaft portion. The one or more flanges may be positioned at one or more locations along its length.

In some examples, the first shaft portion extends between a first (shaft) end and a second (shaft) end, wherein at each of the first and second (shaft) end a respective flange is positioned (e.g., a first flange at the first (shaft) end and a second flange at the second (shaft) end).

The flanges may restrict travel of the rotary components relative to the first shaft portion and, therefore, may help to prevent the first and second rotary components from decoupling from the first shaft portion. In some examples, a third flange is arranged at a position between the first and second flange. The relative spacing between the first, second and third flanges may define a stroke length of the linear actuator.

In some examples the spacing between the second and third flange is selected to compensate for a potential reduction in stroke length caused by a failure of the first drive system when the first shaft portion is (e.g., fully) retracted or (e.g. fully) extended. In some examples, the ratio of the spacing between the second and third flange to the spacing between the first and second flange is at least 3:2.

In some examples, the first drive system is arranged to drive the first rotary component to move the linear shaft arrangement. The second drive system may be arranged to drive the second rotary component to move the second shaft portion. Each of the drive systems may typically drive each rotary component using rotational energy from motors.

In some examples, the first drive system comprises a first drive unit and a first gear subsystem. The first drive unit may comprise a first motor. The first drive unit may optionally comprise a first brake and/or a first rotary variable differential transformer. The first gear subsystem may comprise at least one gear arrangement. In some examples, wherein the first drive unit comprises a first motor, the first gear subsystem couples the motor to the first rotary component.

As explained above the second rotary component is arranged to extend at least partially around the longitudinal axis of the linear actuator at a different axial position to the first drive system.

In some examples, the second drive system comprises a second drive unit and a second gear subsystem. The second drive unit may comprise a second motor. The second drive unit may optionally comprise a second brake and/or a second rotary variable differential transformer. Like the first gear subsystem, the second gear subsystem may comprise at least one gear arrangement. In some examples, wherein the second drive unit comprises a second motor, the second gear subsystem couples the second motor to the second rotary component.

An outer surface of the second shaft portion may comprise grooves along the length of the second shaft portion, allowing the second shaft portion to work as a spline shaft. This may allow linear motion, without rotation, when the second drive subsystem is in standby mode while not preventing the second shaft portion from rotating when the second rotary component rotates to cause relative movement between the first shaft portion and the second shaft portion.

In some examples, the second rotary component is fixed to an inner surface of the second shaft portion and arranged to be able to rotate and translate relative to the first shaft portion. Thus, in some examples, rotation and translation of the second rotary component may result in corresponding rotation and translation of the second shaft portion relative to the first shaft portion.

In some examples, the second gear subsystem comprises a wheel nut arrangement for coupling an outer surface of the second shaft portion to the drive unit, the wheel nut arrangement being arranged to, in the first mode, allow translational motion of the second shaft portion relative to at least a portion of the second drive system, and arranged to, in the second mode, allow rotational motion of the second shaft portion relative to at least a portion of the second drive system.

The wheel nut arrangement may comprise a wheel having a plurality of teeth at its outer edge which project radially away from the centre of the wheel. The plurality of teeth may be arranged to allow rotation of the wheel nut to be controlled by the second drive system. The wheel nut arrangement may be located coaxially in relation to the first and second rotary components.

The wheel nut arrangement may comprise a nut, extending azimuthally around its centre. The nut may comprise at least one (e.g., two) groove(s) on its inner surface (the inner surface being that which interfaces with the outer surface of the second shaft portion). The or each groove may be arranged as a loop to allow ball bearings to recirculate therein. The outer surface of the second shaft portion may comprise at least one (e.g., two parallel) grooves extending along the length of the second shaft portion for the grooves on the inner surface of the nut to coincide with. This allows relative linear translation between the second shaft portion and components of the second drive system (e.g., the motor and second gear subsystem) with substantially no friction.

In some examples, the linear actuator is connected to a control system. For examples according to the third aspect, the linear actuator system comprises the control system and the linear actuator. The linear actuator system may also comprise a voltage supply module and a position sensor for determining information related to the operation of the linear actuator system, e.g., information related to the linear movement of the moveable end.

In some examples, the linear actuator comprises the position sensor. The position sensor may be positioned within a cavity defined by the inner surface of the first shaft portion. In some examples, the inner surface of the first shaft portion interfaces with the position sensor via a spline, e.g., to allow relative linear motion between the two (along the longitudinal axis of the linear actuator).

The position sensor may comprise a linear variable differential transformer (LVDT).

For example, if the position sensor comprises an LVDT, the moveable end may be rigidly connected to a push rod which holds a ferromagnetic (cylindrical) core. In such an example, when the moveable end translates along the longitudinal axis it follows that the push rod also translates along the longitudinal axis, thus moving the ferromagnetic core within coils of the LVDT, inducing a voltage in the LVDT, allowing the LVDT to provide positional feedback relating to the stroke of the linear actuator.

If the linear actuator (system) is operating normally, when a voltage is applied to the first drive system to drive the first rotary component, linear translation of the moveable end may typically be expected. This movement of the moveable end may be determined using the position sensor, such that when the movement is not detected, the second drive system may "take over" to continue movement of the moveable end.

In some examples, the control system controls a voltage supply to the second drive system in response to information received from the position sensor. For example, the control system may control the linear actuator (to supply a voltage to the second drive system, e.g., to turn on the second motor) in response to information received from the position sensor. The information received from the position sensor may be indicative of a failure of the first drive system.

As outlined above, a failure may be determined by the control system. In some examples, the control system evaluates two or more parameters related to the operation of the linear actuator to determine that a failure has occurred. The two or more parameters may comprise the voltage supplied to the first drive system and information received from the position sensor. For example, the two or more parameters may be evaluated with respect to an expected relationship. In one example, such a relationship could be the voltage supplied to the first drive system in relation to the expected movement of the moveable end (as a result of the supply voltage).

In some examples, a voltage is supplied to the first drive system (e.g., to drive the motor at a certain speed), and the control system evaluates information received from the position sensor (e.g. relating to movement of the moveable end) to the voltage supplied to the first drive system. If the moveable end is not moving as expected (e.g. not moving at all) based on the information from the position sensor, then the control system may determine that a failure of the first drive system has occurred.

In some examples, the linear actuator comprises one or more housing(s). The or each housing may comprise any suitable material, e.g. metal or a polymer-based material. The housing may surround one or more components of the linear actuator. In some examples, the one or more housing (s) are arranged to allow relative movement between the second shaft portion and the first shaft portion.

BRIEF DESCRIPTION OF THE DRAWINGS

One or more non-limiting examples will now be described, by way of example only, and with reference to the accompanying figures in which:

FIG. 6 shows a perspective view of a linear actuator with an outer housing.

DETAILED DESCRIPTION OF THE INVENTION

The examples described herein may be used for the jam-tolerant linear actuation of parts in an aircraft. Other applications where mechanical parts are linearly actuated are, however, also envisaged and the examples are not limited to this.

Figure 1:
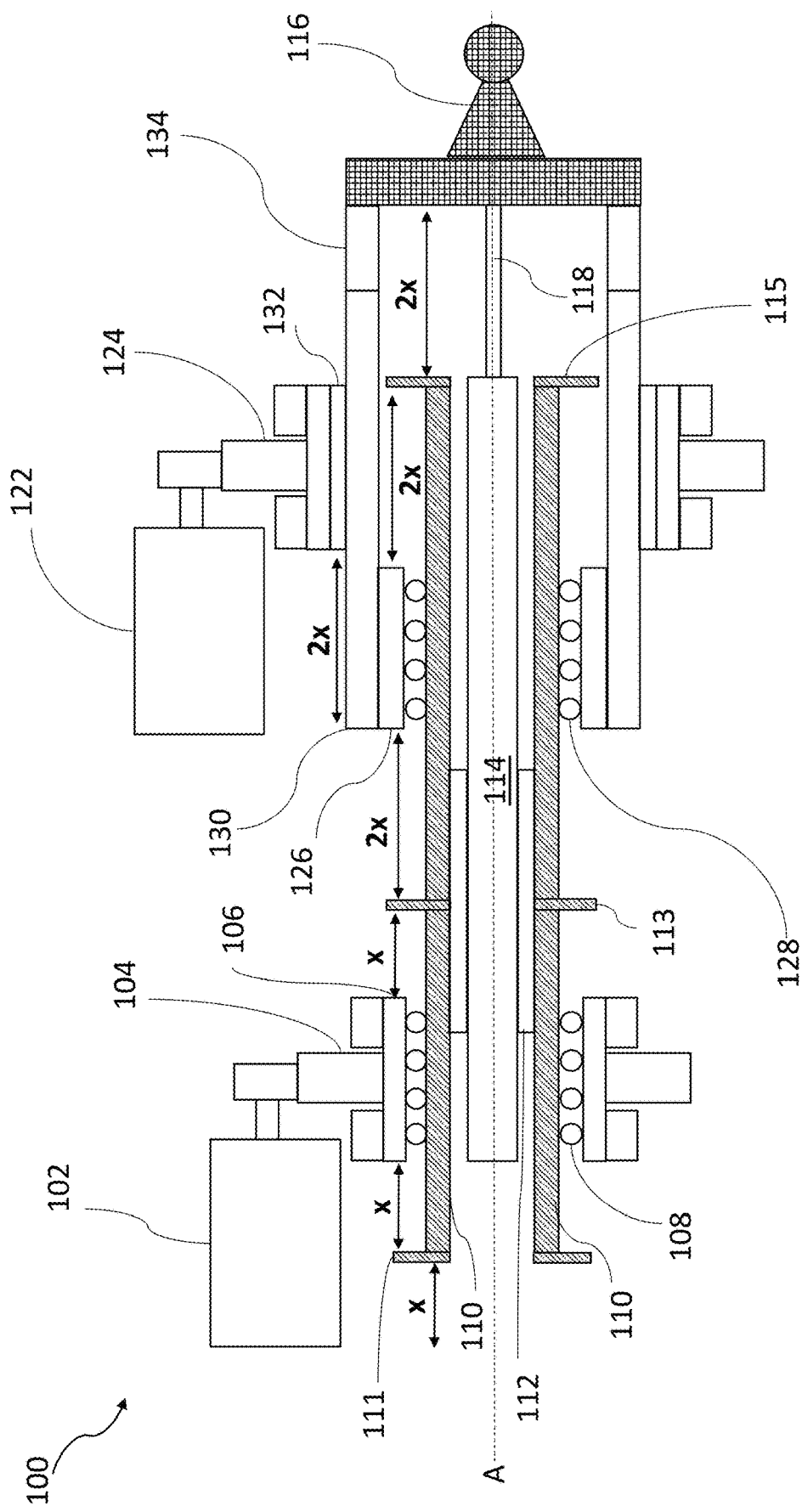
FIG. 1 shows a schematic view of a linear actuator.

FIG. 1 shows a schematic view of a linear actuator 100. The linear actuator 100 is for converting rotary motion to linear motion and has uses in safety-critical flight surface actuation, e.g., flaperon actuators.

The linear actuator 100 includes a linear shaft arrangement for translating a moveable end 116, a first drive system, a second drive system and a housing (not shown). The linear shaft arrangement extends along a longitudinal axis A of the linear actuator 100.

The linear shaft arrangement includes a first shaft portion 110 (hereinafter referred to as the 'screw') and a second shaft portion 130 (hereinafter referred to as the 'piston').

The screw 110 extends linearly, so that its longitudinal axis is coaxial with the longitudinal axis A of the linear actuator 100. In this example the screw 110 is a ball screw. The outer surface of the screw 110 comprises a screw thread having helical grooves (not shown).

The linear actuator 100 comprises a first drive unit 102 comprising a first motor, a first brake and a first rotary variable differential transformer (RVDT) (not shown). The first drive system comprises the first drive unit 102, a first gear subsystem 104 and a (ball screw) nut 106. The first drive unit 102 is arranged to control the motion of the nut 106 via the first gear subsystem 104.

The nut 106 extends azimuthally around the outer curved surface of the screw 110, with a set of ball bearings 108 arranged between the screw 110 and the nut 106, such that the nut 106 is able to rotate azimuthally with respect to the screw 110 (i.e., around the screw 110). The nut comprises a plurality of grooves on its inner surface arranged to engage with the ball bearings 108. The ball bearings 108 are arranged to engage with the screw thread to allow translation of the screw 110 relative to the nut 106.

At another position along the screw 110, spaced from the nut 106, is a second drive unit 122, comprising a second motor, a second brake and a second RVDT (not shown). The second drive system comprises the second drive unit 122, a second gear subsystem 124 and a rotational coupling 126. The second drive unit 122 is arranged to control the motion of the piston 130 via the second gear subsystem 124.

The rotational coupling 126 is arranged to extend azimuthally around the outer curved surface of the screw 110, with a set of ball bearings 128 arranged between the screw 110 and the rotational coupling 126. The rotational coupling 126 comprises a plurality of grooves on its inner surface arranged to engage with the ball bearings 126. The ball bearings 128 are arranged to engage with the screw thread to allow translation of the screw 110 relative to the rotational coupling 126.

The rotational coupling 126, ball bearings 128 and screw 110 together form part of a ball screw actuator. This may be more precise than a lead screw actuator. Alternatively, the ball screw actuator may be replaced with a planetary roller screw actuator, which may be more efficient but less compact.

The rotational coupling 126 is fixedly connected to the piston 130, such that they are able to co-rotate. The rotational coupling 126 engages with the thread of the outer surface of the screw 110 via the ball bearings 128. The piston 130 is also connected via a spline 132 to the second drive unit 122.

The screw 110 is hollow, and the inner curved surface of the screw 110 is arranged to be in contact with a spline 112. The spline 112 is arranged around the inside of the screw. The outer surface of the spline 112, in contact with the inner surface of the screw 110, comprises grooves complementary to the inner thread of the screw. The opposite, inner surface of the spline 112 is in contact with a linear variable differential transformer (LVDT) 114. This allows for linear translation of the screw 110 relative to the LVDT.

The screw 110 further comprises flanges 111, 113 and 115. Each of the flanges 111, 113 and 115 extends azimuthally around the outer surface of the screw 110, and projects radially outwards from the screw 110. The flanges 111, 113 and 115 are spaced axially along the length of the screw 110.

The linear actuator 100 is shown 'mid-stroke' in FIG. 1, i.e., the screw 110 is at approximately the centre-point of its available stroke length. The stroke length is defined by the position of the flanges 111, 113 and 115.

The total stroke length of the linear actuator 100, i.e., the distance the moveable end 116 may travel from minimum to maximum extension is 2x. Two of the flanges 111 and 113 are positioned a distance x from either side of the nut 106. The middle flange 113 and the other flange 115 are positioned a distance 2x from either side of the rotational coupling 126.

The flanges 111 and 113 either side of the nut 106 are arranged to prevent travel of the nut 106 beyond the minimum and maximum displacement of the moveable end 116. The flanges 113 and 115 either side of the rotational coupling 126 are arranged to prevent travel of the rotational coupling 126 beyond the minimum and maximum displacement of the moveable end 116. This helps to prevent collision of the nut 106 and the rotational coupling 126. This may further prevent overextension or excessive loosening of the linear actuator.

The LVDT 114 extends along the inside of the screw 110 along substantially its whole length. The moveable end 116 is arranged to be rigidly connected to a push rod 118 connected to a ferromagnetic core (not shown). When the piston 130 causes linear translation of moveable end 116, the push rod 118 will move within the LVDT 114, thus moving the ferromagnetic core within the coils of the LVDT, allowing the LVDT to provide positional feedback relating to the stroke of the linear actuator 100.

For the purpose of clarity, the schematic shown in FIG. 1 does not include all of the components of the linear actuator 100, e.g., a housing.

Figure 2:
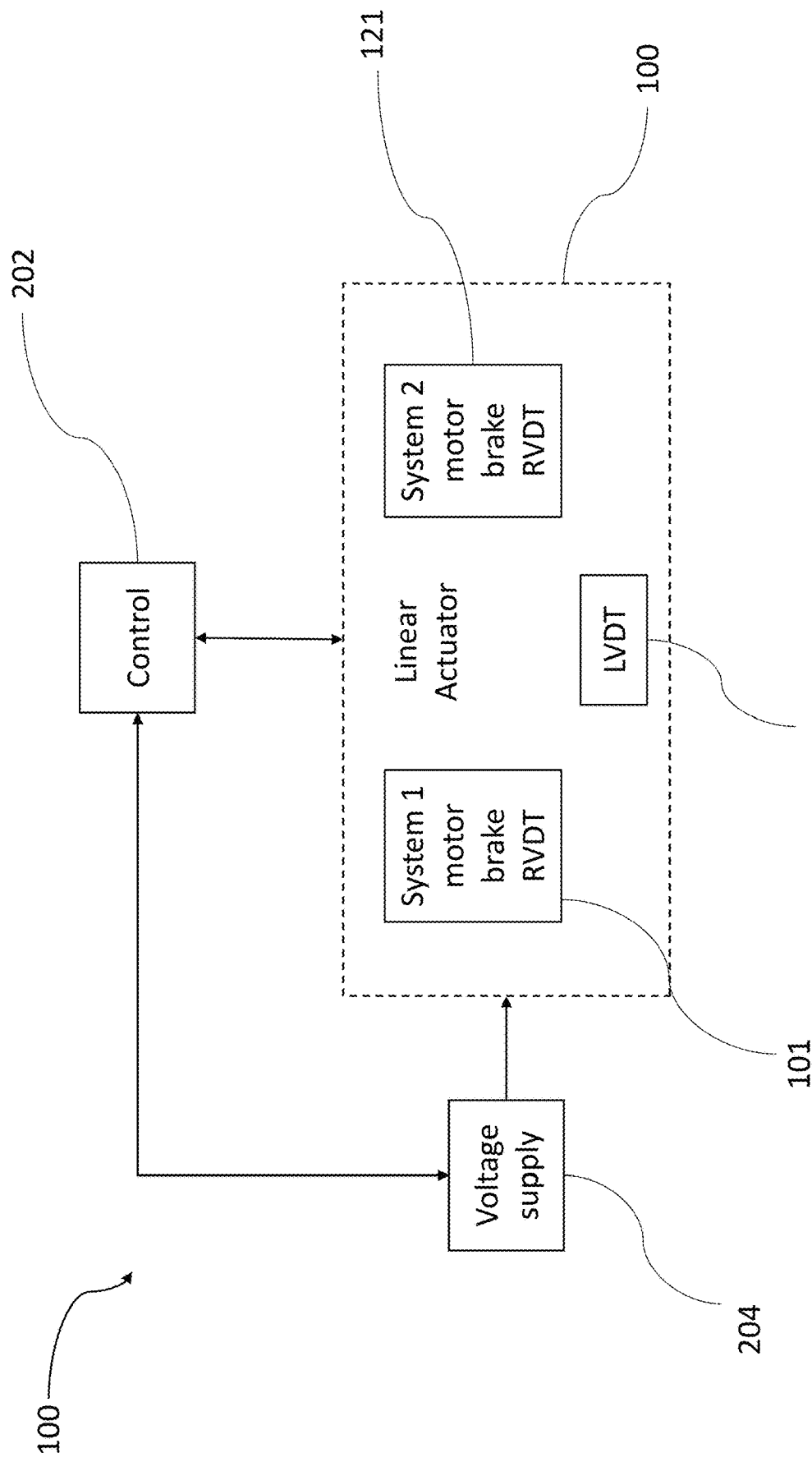
FIG. 2 shows a schematic system diagram of the operation of a linear actuator.

FIG. 2 shows a schematic system diagram showing the operation of the linear actuator. The linear actuator 100 includes the first drive system 101 (comprising the first drive unit, which comprises the first motor, the first brake and the first RVDT), the second drive system 121 (comprising the second drive unit, which comprises the second motor, the second brake and the second RVDT) and the LVDT 114. A voltage supply 204 is connected to the linear actuator 100, for supplying power to the linear actuator 100. A control unit 202 is in communication with the voltage supply 204 and the linear actuator 100.

The LVDT 114 is arranged to transmit information regarding the linear motion of moveable end 116 to a control unit 202. The control unit 202 is arranged to evaluate the information from the LVDT 114 and a voltage supply 204. Further details of the operation of the linear actuator with reference to FIG. 2 is described below.

Figure 3:
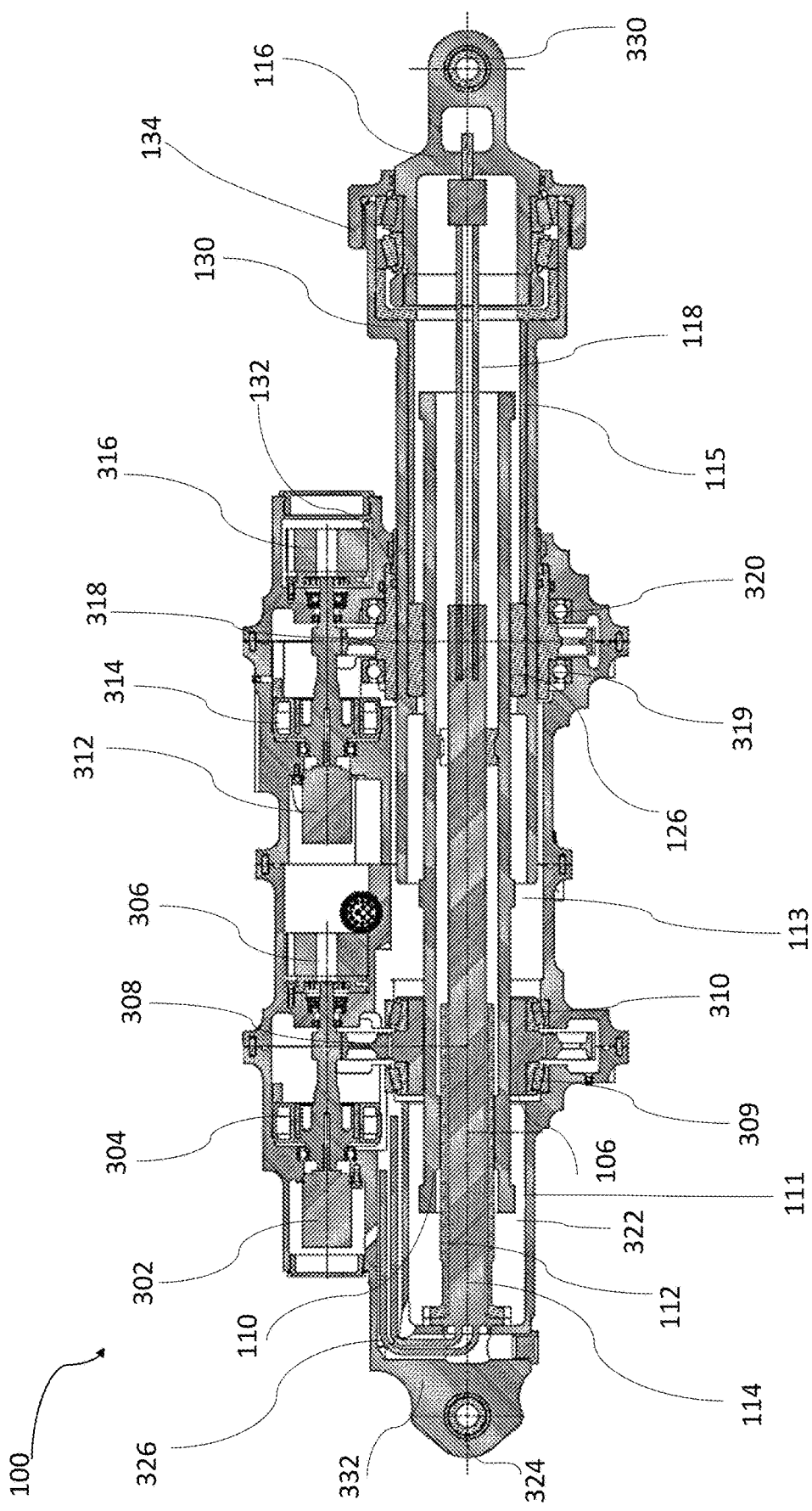
FIG. 3 shows an axial cross-section of a linear actuator.

FIG. 3 shows an axial cross-section of the linear actuator 100, further to the schematic view shown in FIG. 1. This cross-section includes a screw housing 322 surrounding the outer surface of the screw portion 110, and an outer housing 332 surrounding the first and second drive systems and the screw housing 322 (not the piston 130).

The linear actuator 100 comprises a first motor 304, a first rotary variable differential transformer (RVDT) 302 and a first brake 306, each comprising part of the first drive unit, e.g., as described with reference to FIG. 1. The first drive system further comprises a first wheel 308, wherein the first wheel 308 comprises a plurality of teeth arranged azimuthally about the outer circumference of the wheel 308. The first drive system also comprises a set of first wheel bearings 309 and 310.

The first motor 304 is arranged to turn the first wheel 308, wherein the first wheel extends azimuthally around the outer curved surface of the screw housing 322. The first motor 304 comprises grooves arranged to engage with the plurality of teeth arranged about the outer circumference of the wheel 308. The first wheel 308 is adjacent to each of the first wheel bearings 309 and 310, which are arranged to extend azimuthally around the outer curved surface of the screw housing 322. The first wheel 308 and first wheel bearings 309, 310 each comprise part of the first gear subsystem, e.g. described with reference to FIG. 1.

The first wheel 308 is arranged to be in contact with the nut 106, which extends azimuthally around the outer curved surface of the screw housing 322. The nut 106 lies between the first wheel 308 and the outer curved surface of the screw housing 322. The nut 106 is rotationally coupled to the screw 110 by ball bearings (e.g., as shown in FIG. 1) arranged between the screw 110 and the nut 106, via a gap in the screw housing 322. By this arrangement the first wheel 308 is able to actuate azimuthal rotation of the screw 110 about its axis.

The first wheel bearings 309 and 310 are arranged to maintain the axial position of the first wheel 308, against the axial load of the screw 110.

The linear actuator 100 further comprises a second motor 314, a second RVDT 312 and a second brake 316, each comprising part of the second drive unit, e.g. as described with reference to FIG. 1. The second drive system further comprises a second wheel 318, wherein the second wheel 318 comprises a plurality of teeth arranged azimuthally about the outer circumference of the wheel 318. The second drive system also comprises a set of second wheel bearings 319 and 320.

The second motor 314 is arranged to turn the second wheel 318, wherein the second wheel extends azimuthally around the outer curved surface of the piston 130, spaced axially from the first wheel 308. The second motor 314 comprises grooves arranged to engage with the plurality of teeth arranged about the outer circumference of the wheel 318. The second wheel 318 is adjacent to each of the second wheel bearings 319 and 320, which extend azimuthally around the outer curved surfaced of the piston 130. The second wheel 318 and second wheel bearings 319, 320 each comprise part of the second gear subsystem, e.g. as described with reference to FIG. 1.

The second wheel 318 is arranged to be in contact with the rotational coupling 126, which extends azimuthally around the outer curved surface of the piston 130. The rotational coupling 126 lies between the second wheel 318 and the outer curved surface of the piston 130. The rotational coupling 126 is rotationally coupled to the piston 130 by ball bearings (not shown) arranged between the piston 130 and the rotational coupling 126. By this arrangement, the second wheel 318 is able to actuate the piston 130 along its axis.

The second wheel bearings 319 and 320 are arranged to maintain the axial position of the second wheel 318.

The first and/or second RVDTs 302, 312 may allow for fine control of the rotation of the first and/or second wheels 308, 318. The first and/or second brakes 306, 316 may reduce or prevent the rotation of the first and/or second wheels 308, 318. The first and/or second brakes 306, 316 may reduce or prevent rotation of the first and/or second motors 304, 314, which engage with the first and/or second wheels 308, 318 via the plurality of teeth.

The linear actuator 100 further comprises eyelets 324 and 330 at either end, which may allow for mounting of the linear actuator as part of a mechanical system or machine. The first eyelet 324 is a part of the outer housing 332, and so may be mounted as to hold the linear actuator in a fixed position. The second eyelet 330 is part of the moveable end 116, and so may be attached to a movable machine portion. This may allow for simple installation of the linear actuator 100 into a larger mechanical system or machine.

The LVDT 114 further comprises wires 326 which extend from the LVDT to a control (not shown). The wires 326 allow for communication of the operation of the LVDT. The wires 326 may also comprise an earth wire.

Figure 4:
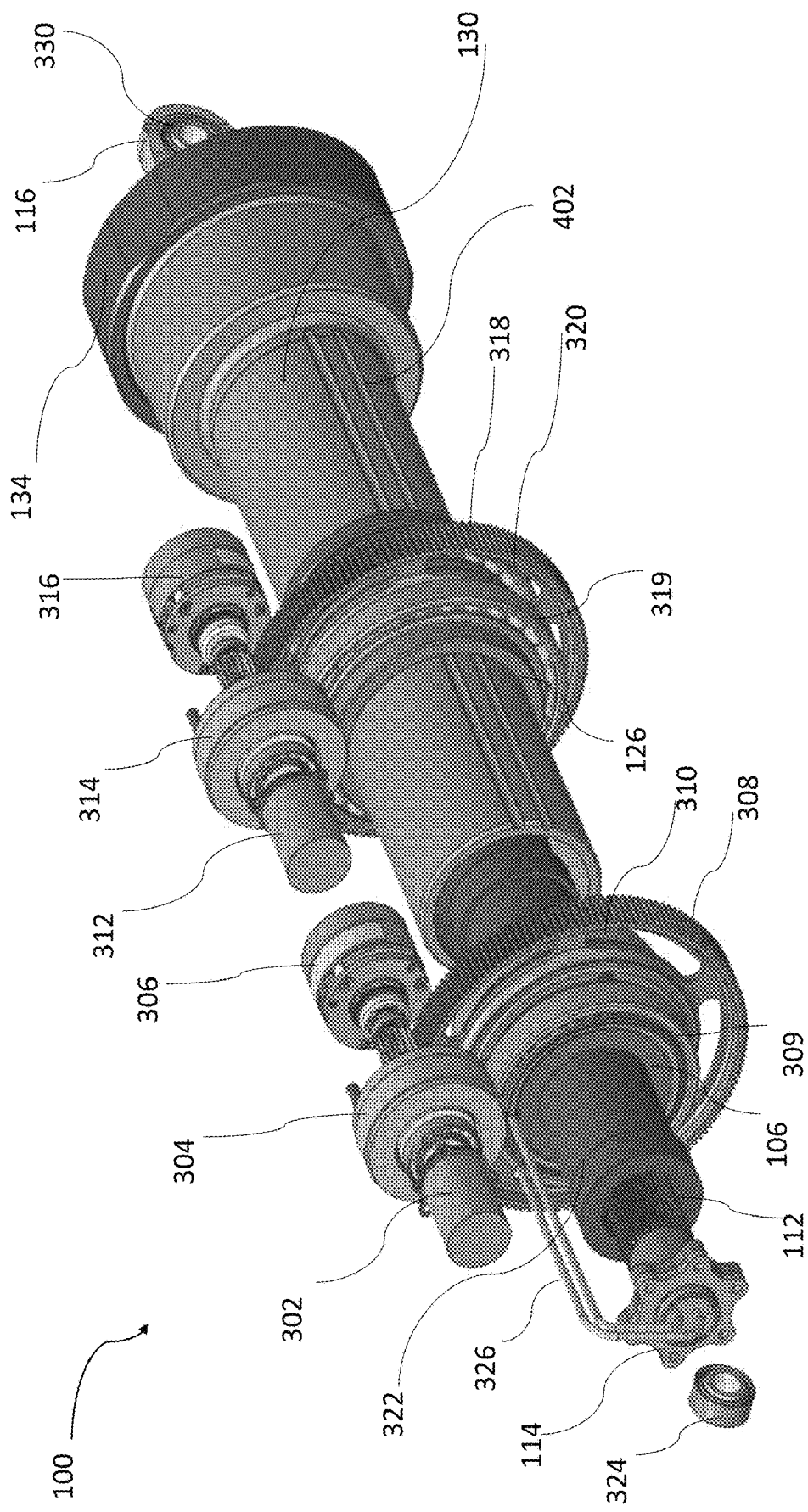
FIG. 4 shows a perspective view of a linear actuator.

FIG. 4 shows a perspective view of the linear actuator described in FIG. 3, where the outer housing 332 is not shown.

The outer surface of the piston 130 comprises grooves 402. The grooves 402 are arranged to extend along the axial length of the piston 130 and are arranged to receive the ball bearings (not shown). The ball bearings (not shown) are mounted in the grooves 402 to allow for motion of the piston 130 relative to the rotational coupling 126 along its full stroke length.

Figure 5:
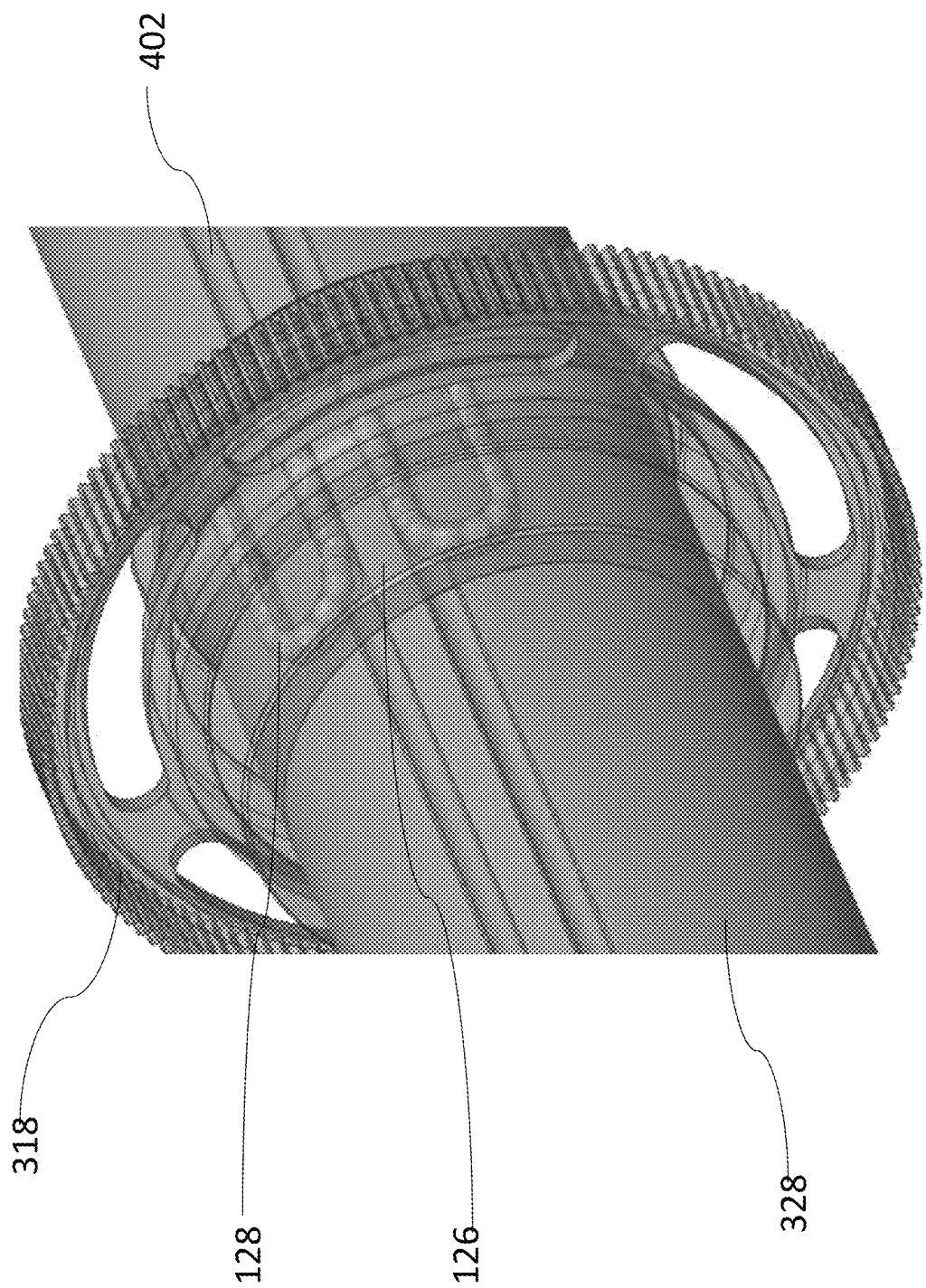
FIG. 5 shows a perspective view of an enlarged section of the linear actuator shown in FIG. 4.

FIG. 5 shows an enlarged perspective view of the grooves 402 shown in FIG. 4, with the ball bearings 128 shown.

FIG. 6 shows a perspective view of the linear actuator 100 with the outer housing 332 in place. The outer housing 332 surrounds the first and second drive systems and the screw housing 322, and incorporates the first eyelet 324. The piston 130, bearing 134 and moveable end 116 (as shown in FIGS. 1 and 3) are not included in the outer housing 332, allowing for axial motion of the piston 130.

Operation of the linear actuator 100 of FIG. 1, will now be described with reference to FIGS. 1 to 6.

In normal operation, the first drive system 101 is operational (i.e., the motor 304 of the first drive unit 102 is switched on) and the second drive system 121 is on standby mode (i.e. ready to be energised in the event of a failure of the first drive system 101).

The standby mode of the second drive system 121 is defined by the second motor 314 of the second drive unit 122 being turned off, and the second brake 316 being turned on such that the second wheel 318 is prevented from rotating, and hence the piston 130 and rotational coupling 126 are prevented from co-rotating.

Rotation of the nut 106, as activated by the motor of the first drive unit 102, causes the screw 110 to translate linearly along the longitudinal axis A of the linear actuator 100. The direction of linear translation of the screw 110 will depend on the direction of rotation of the nut 106.

When the screw 110 is translated linearly by the first drive unit 102, the rotational coupling 126 is prevented from rotating, so that it translates linearly in the same direction as the screw 110. The rotational coupling 126 is connected to the hollow piston 130. Translation of the rotational coupling 126, therefore, causes the piston 130 to translate along the longitudinal axis A of the linear actuator 100.

The end of the piston 130, distal to the first drive system 101, contacts the moveable end 116 via a bearing 134. The bearing 134 transmits the linear motion of the piston 130, but not the rotational motion of the piston 130. Therefore, when the piston 130 is translated and rotated, the moveable end 116 will move linearly along the longitudinal axis A of the linear actuator and not be rotated.

When the first drive unit 102 is operational, the nut 106 rotates and allows the screw 110 to translate over a total stroke length of 2x, when starting at the minimum stroke. The translation of the screw 110 actuates linear translation of the rotational coupling 126, and hence the piston 130 and moveable end 116 also are allowed to translate over a total distance 2x.

The control unit 202 registers the output from the LVDT 114 and input from the voltage supply 204 to the first drive unit 102. The control unit 202 then evaluates these parameters by comparing them to an expected relationship between the voltage input and the motion of the moveable end 116. If the voltage input does not result in the expected motion detected by the LVDT 114, a jam will be registered by the control unit 202. The control unit 202 will then activate the second drive unit 122 in order to drive movement of the piston 130 and hence linear translation of the moveable end 116, without requiring translation of the screw 110, which may be jammed.

In the case that the nut 106 jams, the first drive system is not operational, meaning a failure has occurred and the linear actuator switches to a back-up mode. In this instance, the second drive unit 122 is taken out of standby mode and is energised (i.e., the second motor 314 is turned on, and the second brake 316 is turned off).

When activated, the second drive unit 122 drives rotation of the piston 130 causing the rotational coupling 126 to rotate. Rotation of the rotational coupling 126 causes the piston 130 to rotate about its longitudinal axis, which actuates the piston 130. Actuation of the piston 130 causes the piston to translate along the longitudinal axis A of the linear actuator 100.

If the jam has occurred where the end of the screw 110 is at a distance of 2x from the nut 106, the actuation of the piston 130 is able to compensate for the position of the jammed screw, by extending or retracting by 2x along the longitudinal axis A of the linear actuator. This enables the moveable end 116 to be translated by 2x along the longitudinal axis A of the linear actuator 100.

This is enabled by the flanges of the screw 113 and 115 allowing for the rotational coupling 126 to translate 2x along the screw, regardless of the positioning of where the first nut has jammed between the flanges 111 and 113.

The flanges 111, 113 and 114 are spatially arranged along the axis of the screw 110 such that if the nut 106 jams when the screw is fully retracted or fully extended, the piston 130 may compensate for this motion in either direction.

Therefore, regardless of whether the first drive system or the second drive system is actuating linear translation of the moveable end 116, and regardless of at which point of the stroke the screw 110 has jammed, the moveable end 116 will have a full range of motion.

The linear actuator 100 arrangement and control 202 may allow for an easy switch between the gear-based first drive system 101 and the direct piston-driven second drive system 102.

Additionally, during the stroke, whether the piston 130 is being driven by the first drive system 101 or second drive system 102, the first brake 306 and the second brake 316 each have the capability to hold the moveable end at a fixed position in the stroke, without the need for any power input. This may allow the linear actuator to have improved power efficiency.

Thus, in at least some examples, the linear actuator may continue operating, in the event of a failure of the first drive system, without requiring relative motion between the first drive system and the first shaft portion and without sacrificing any range of motion. This may allow the second drive system to have full recovery capability in the event of jamming of the first drive system.

This may further prevent the linear actuator from failing due to non-operation of the first drive system. This may be useful for safety critical applications which require a reliable back-up system which may allow the linear actuator to continue operation despite a failure of the first drive system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A linear actuator arranged to convert rotary motion to linear motion, comprising:
    a linear shaft arrangement, comprising a first shaft portion and a second shaft portion, the linear shaft arrangement extending along a longitudinal axis of the linear actuator, wherein at least one of the first shaft portion and the second shaft portion of the linear shaft arrangement is arranged to be translated linearly along the longitudinal axis upon actuation of the linear actuator;
    a first drive system comprising a first rotary component arranged to extend at least partially around the longitudinal axis and arranged to rotate about the longitudinal axis to actuate the linear shaft arrangement; and
    a second drive system comprising a second rotary component arranged to extend at least partially around the longitudinal axis at a different axial position to the first drive system;
    wherein the linear actuator is arranged, when the first drive system fails, to effect rotation of the second rotary component about the longitudinal axis to actuate the linear shaft arrangement so that the second shaft portion moves relative to the first shaft portion; and wherein the first shaft portion comprises a screw shaft portion comprising helical grooves on an outer surface of the screw shaft portion.

2. The linear actuator as claimed in claim 1, wherein the linear actuator extends between a first end and a second end, the second end being a moveable end;

wherein actuation of the linear shaft arrangement causes the moveable end to translate along the longitudinal axis, relative to the first end.

3. The linear actuator as claimed in claim 2, wherein the second shaft portion is coupled to the moveable end via one or more bearings.

4. The linear actuator as claimed in claim 1, wherein the linear actuator is arranged to be operated in a first mode and a second mode;

wherein the linear shaft arrangement is arranged, in the first mode, to move relative to the first rotary component;

wherein the first shaft portion and second shaft portion are arranged to be fixed relative to each other; and when the linear shaft arrangement is arranged, in the second mode, so that the second shaft portion is able to translate and rotate relative to the first shaft portion.

5. The linear actuator as claimed in claim 1, wherein the second shaft portion comprises a substantially cylindrical hollow shape arranged as a sleeve having a greater cross-sectional diameter than the cross-sectional diameter of the first shaft portion.

6. The linear actuator as claimed in claim 1, wherein the first shaft portion extends between a first end and a second end;

wherein the first shaft portion comprises a first flange, a second flange and a third flange each protruding radially from and extending azimuthally around the first shaft portion; and wherein the first flange is located at the first end of the first shaft portion, the second flange is located at the second end of the first shaft portion, and the third flange is located between the first and second flanges.

7. The linear actuator as claimed in claim 6, wherein a spacing between the second and third flanges is arranged to compensate for a potential reduction in stroke length caused by a failure of the first drive system, when the first shaft portion is retracted or extended.

8. The linear actuator as claimed in claim 1, wherein the first drive system comprises a first drive unit and a first gear subsystem, the first drive unit comprising:

a first motor;

a first brake; and a first rotary variable differential transformer;

wherein the first gear subsystem couples the motor to the first rotary component; and wherein the second drive system comprises a second drive unit and a second gear subsystem, the second drive unit comprising:

a second motor;

a second brake; and a second rotary variable differential transformer;

wherein the second gear subsystem is arranged to couple the second motor to the second rotary component.

9. The linear actuator as claimed in claim 1, wherein the second rotary component is fixed to an inner surface of the second shaft portion and is arranged to be able to rotate and translate relative to the first shaft portion, so that rotation and translation of the second rotary component results in corresponding rotation and translation of the second shaft portion relative to the first shaft portion.

* * * * *